US007258310B2

(12) United States Patent
Norris

(10) Patent No.: US 7,258,310 B2
(45) Date of Patent: Aug. 21, 2007

(54) APPARATUS FOR COUPLING INTRAVENOUS INFUSION UNITS WITH MOBILE TRANSPORT VEHICLES

(76) Inventor: Jerry W. Norris, 580 Lee Cir., Cropwell, AL (US) 35054

(*) Notice: Subject to any disclaimer, the term of this patent is extended or adjusted under 35 U.S.C. 154(b) by 343 days.

(21) Appl. No.: 10/754,650

(22) Filed: Jan. 12, 2004

(65) Prior Publication Data

US 2005/0150851 A1 Jul. 14, 2005

(51) Int. Cl.
*F16M 11/00* (2006.01)

(52) U.S. Cl. .............................. 248/125.7; 248/219.1; 248/230.1

(58) Field of Classification Search ............ 248/125.7, 248/125.1, 226.11, 230.1, 230.7, 230.8, 228.7, 248/228.8, 231.81, 122.1, 218.4, 219.1–219.4
See application file for complete search history.

(56) References Cited

U.S. PATENT DOCUMENTS 4,489,454 A * 12/1984 Thompson .................. 5/503.1
4,511,157 A 4/1985 Wilt, Jr. ...................... 280/289
4,511,158 A 4/1985 Varga et al. ................ 280/292
4,600,209 A * 7/1986 Kerr, Jr. ..................... 280/400
4,840,391 A 6/1989 Schneider ................ 280/304.1
5,374,074 A 12/1994 Smith ...................... 280/304.1
5,390,886 A * 2/1995 Lawner et al. ........... 248/224.7
5,421,548 A 6/1995 Bennett et al. ............. 248/129
5,509,680 A 4/1996 Scharf et al. ............ 280/304.1
5,921,443 A * 7/1999 McMillan ................... 222/174
6,179,260 B1 * 1/2001 Ohanian ................ 248/229.16
6,585,206 B2 * 7/2003 Metz et al. .............. 248/229.1
6,843,456 B1 * 1/2005 Hajianpour .............. 248/230.1
6,966,086 B2 * 11/2005 Metz et al. ..................... 5/510
6,969,031 B2 * 11/2005 Ugent et al. ............. 248/125.8

* cited by examiner

*Primary Examiner*—Anita King
*Assistant Examiner*—Steven Marsh
(74) *Attorney, Agent, or Firm*—Wm. Randall May

(57) ABSTRACT

A coupling apparatus for temporary attachment of a portable medical apparatus, such as an intravenous infusion unit, to a personal mobile transport vehicle such as a wheelchair, hospital bed, gurney or mobile stretcher is disclosed. The apparatus includes a deployable arm which may be pivoted from a storage position alongside the transport vehicle to one or more fully deployed and locked positions for releaseably receiving and securing a portable intravenous infusion unit to the transport vehicle during the transport or relocation of infirmed or ambulatory restricted individuals. The apparatus also includes a stabilization strap for securing and stabilizing medical equipment, intravenous lines or other equipment lines attached to, or emanating from, the portable intravenous infusion unit during a transport operation.

1 Claim, 4 Drawing Sheets

APPARATUS FOR COUPLING INTRAVENOUS INFUSION UNITS WITH MOBILE TRANSPORT VEHICLES

FIELD OF THE INVENTION

This invention relates generally to medical equipment and the transportation of medical equipment when moving or relocating infirmed or ambulatory-restricted patients. More particularly, the present invention relates to a new and improved coupling device for temporary attachment of intravenous infusion units to mobile transport vehicles such as wheelchairs, hospital beds or gurneys.

BACKGROUND OF THE INVENTION

Transportation or movement of infirmed, non-ambulatory or ambulatory-restricted patients or patrons within a medical facility, nursing home or assisted living facility is common and may occur many times a day for various reasons. Movement of patients or patrons within the facility or elsewhere generally involves the use of a personal transport vehicle such as a wheelchair, gurney or mobile stretcher. The movement or transport of such patients or patrons quite often includes the simultaneous movement of medical equipment that may be physically attached to the patient or patron for monitoring purposes and/or for intravenously feeding or medicating the individual.

Individuals requiring intravenous fluids or medications generally receive such fluids or medications through the use of elevated bags or pumping mechanisms attached to a support unit or stand located next to, or in close proximity with, the infirmed individual. It is important, and quite often crucial, that the intravenous fluids and/or medications being given to an infirmed individual be moved along with the individual so as not to interrupt or terminate the flow of such fluids or medications which may be critical to said individual. In many cases, devices that monitor the vital statistics of such individuals must also be moved along with the individuals during transport. Free standing mobile intravenous infusion units, or "I.V. stands", are commonly used to hold and also transport such fluids, medications or other medical equipment attached to infirmed individuals as they are being transported from one location to another. A typical mobile I.V. stand in use today includes a vertical pole or standard attached to a wheeled or castered base and is provided with one or more limbs, hooks or mounting brackets situated near the top of the I.V. stand for the attachment of feeding or medication bags, I.V. pumps, monitors and/or other medical equipment attached to the infirmed individual. Generally, unless the patient or patron is physically capable of holding and guiding the portable I.V. stand during the transport operation (which is an inherently dangerous and otherwise impractical proposition), at least two attendants are required to safely move the patient and to maintain his or her accompanying I.V. stand in close proximity to the patient during said movement. The use of two attendants to move one individual is obviously very costly and is an inefficient utilization of valuable personnel.

Typically, once a patient or patron has been transported to a desired location, the patient or patron must then be removed, at least temporarily, from the transport vehicle for whatever purpose(s) or event(s) (treatment, therapy, tests, etc.), which occasioned the relocation of said patient or patron. It is therefore very important that a nurse or other attendant be able to quickly and easily release the I.V. stand containing the patient's medical equipment from any coupling mechanism attached to the transport vehicle or otherwise so as to allow the I.V. stand to accompany the patient when the patient is removed from the transport vehicle for treatment. This would be especially important in emergency or life threatening situations.

Various devices have been proposed for attaching, tethering or rigidly affixing mobile I.V. stands to the transport vehicles being used to move or relocate infirmed individuals. However, known devices, such as those disclosed in applicant's information disclosure statement submitted herewith, are not without disadvantages, limitations and/or shortcomings which are overcome by the design and operation of the present invention.

For example, a device disclosed in U.S. Pat. No. 5,374,074 issued to Smith teaches a coupling mechanism for the attachment of a mobile I.V. stand to one of the lower tubular cross members supporting a foldable wheelchair. Attachment of a mobile I.V. stand to a wheelchair utilizing this device requires the mobile I.V. stand to be positioned directly behind the wheelchair and between the push handles of the chair. Depending on the condition of the patient or patron, a mobile I.V. stand may be required to support one or more feeding or medication bags, pumps, and/or various monitoring devices as well as the flow or sensory lines attached these devices. The position and placement of a mobile I.V. stand in the manner suggested by the Smith reference not only obstructs the vision of the attendant, but also invades the physical space of the attendant thereby requiring the attendant to straddle the I.V. stand when attempting to walk and push the wheelchair. The positioning of the clamping mechanism of this reference also requires an attendant to stoop, squat or sit in order to attach the mobile I.V. stand to the wheelchair or to release the mobile I.V. stand from the wheelchair.

Another device, disclosed in U.S. Pat. No. 4,840,391 to Schneider, presents a mobile I.V. stand coupled to the upper frame of a wheelchair. This coupling method uses a clamp and latch means having a pair of interconnected hemi-cylindrical pieces attached to a telescoping tubular member for grasping and holding the pole or standard of a mobile I.V. stand. Disadvantages of this reference include difficulty of attaching the pole or standard of a mobile I.V. stand to the clamp and latch means of the device and of quickly and easily detaching and removing the mobile I.V. stand from the device when the patient is being removed from the chair. A further disadvantage of this reference includes the position of the clamp and latch mechanism that is restricted to the front of the wheelchair and interferes with patient access to and from the wheelchair, even when the device is in a fully retracted configuration.

U.S. Pat. No. 5,509,680 to Scharf, et al. discloses another coupling mechanism for towing a mobile I.V. stand behind a wheelchair using a tether. This device contemplates the use of upper and lower rear extension members rigidly attached to one of the rear support legs of a wheelchair and having a pair of towing rods pivotally connected to upper and lower post couplers. In order to use the device, the upper and lower post couplers must be attached to the pole or standard of the mobile I.V. stand using a first and second semi-cylindrical member threadably engaged one to the other. The upper and lower post couplers of this reference are securely attached to the pole or standard of the mobile I.V. stand and are pivotally attached to the upper and lower towing rods of the upper and lower rear extension members. The post couplers of this reference are not designed to be quickly detached or easily uncoupled and, in fact, the couplers and the respective towing rods attached thereto are designed to remain with the mobile I.V. stand pole or standard once they are installed. The attachment of an I.V. stand to the coupling mechanism in the manner described by this reference would allow the stand to uncontrollably pivot or swing back and forth behind the transport vehicle as the vehicle is being turned or moved. Release of the mobile I.V. stand is accomplished by mechanically disconnecting the towing rods from the upper and lower rear extension members. Another problem or disadvantage associated with this reference is the obstruction of vision and the limitation of movement of the attendant due to the I.V. stand being moveably situated behind the transport vehicle and the intravenous lines and/or other equipment lines to the infirmed individual being required to cross in front of and/or around the attendant.

The present invention is a modification and significant improvement over prior art and incorporates unique and novel design features which distinguish the invention over the existing art.

SUMMARY OF THE INVENTION

In view of the foregoing, it is a primary object of this invention to provide a new and improved coupling apparatus for the temporary attachment of a mobile medical apparatus, such as a mobile intravenous infusion unit or mobile medical equipment stand, to a personal mobile transport vehicle such as a wheelchair or mobile stretcher.

According to an embodiment of the invention, a coupling apparatus for temporary attachment of a mobile medical equipment apparatus or mobile I.V. stand to a personal mobile transport vehicle comprises a deployable arm which may be rotated from a storage position alongside the transport vehicle to a fully deployed and locked position for releaseably receiving and securing a mobile I.V. stand to said transport vehicle. The device also includes a strap means for securing and stabilizing medical equipment, I.V. lines and/or other equipment lines, attached to or emanating from, the mobile I.V. stand during a transport operation.

An important advantage of the present invention is the provision of a coupling apparatus for the temporary attachment of a mobile I.V. stand to a mobile transport vehicle which will allow one person or attendant to quickly and easily transport a patient or patron requiring intravenous infusion and/or medical monitoring from one location to another.

Another advantage of the present invention is the provision of a coupling apparatus for temporary attachment of a mobile I.V. stand to a mobile transport vehicle that will allow an attendant to easily and quickly attach and release the I.V. stand from said apparatus.

Another advantage of the present invention is the provision of a coupling apparatus for temporary attachment of mobile I.V. stands to mobile transport vehicles having design features which allow the device to be easily deployed and provides for multiple positioning of an I.V. stand during a transport operation and/or during patient placement in, or removal from, the mobile transport vehicle.

A further advantage of the present invention resides in the ability to easily rotate the working arm of the device to a convenient, out of the way, locked storage position when the device is not in use.

Another advantage of the present invention is the provision of a coupling apparatus for temporary attachment of mobile I.V. stands to mobile transport vehicles that is easily adaptable for permanent attachment to virtually any mobile transport device.

Another advantage of the present invention is the provision of a coupling apparatus for temporary attachment of mobile I.V. stands to mobile transport vehicles which does not obstruct the vision or physical movement of an attendant during a transport operation.

Another advantage of the present invention is the provision of a coupling apparatus for temporary attachment of mobile I.V. stands to mobile transport vehicles which does not require an attendant to stoop, bend or kneel in order to deploy the device or to attach or release an I.V. stand to or from the device.

Another advantage of the present invention resides in the unique and simplistic design of its rotatable working arm and securing means.

A further advantage of the present invention is the provision of a coupling apparatus for temporary attachment of mobile I.V. stands to mobile transport vehicles that does not require complicated clamps or other mechanisms in order to effectively use the device.

A further advantage of the present invention resides in the ability to quickly and easily release a mobile I.V. stand from the device when moving a patient out of and away from the transport vehicle.

A further advantage of the present invention is the provision of a coupling apparatus for temporary attachment of mobile I.V. stands to mobile transport vehicles which conveniently attaches to virtually any type of transport vehicle.

Another advantage of the present invention resides in its ability to adapt to any size pole or standard used with mobile I.V. stands or other mobile medical equipment apparatus.

A final advantage of the present invention resides in the provision of a stabilization strap for securing and stabilizing medical equipment, and/or I.V. lines, and/or other equipment lines, attached to or emanating from, a mobile I.V. stand during a transport operation.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
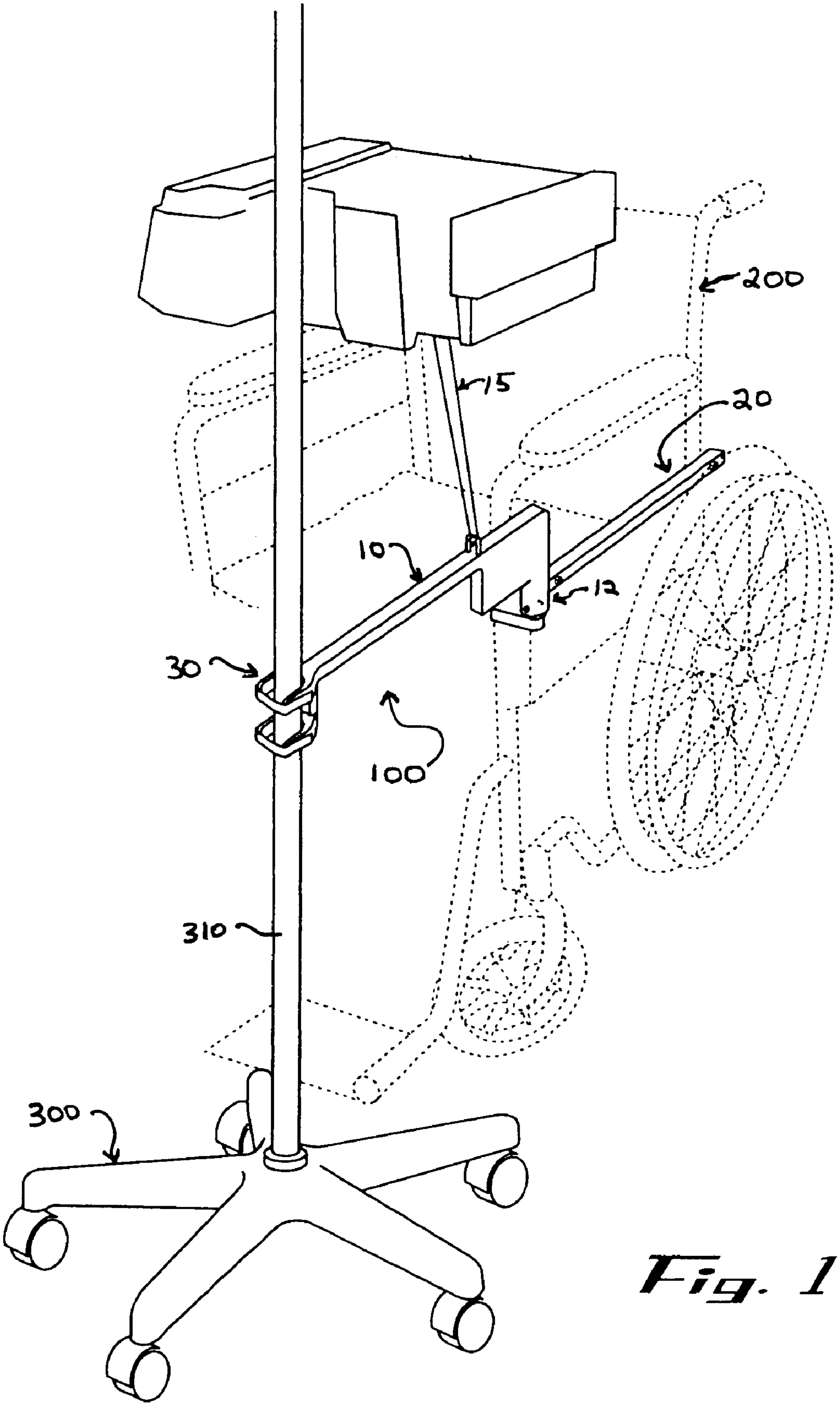
FIG. 1 is a perspective view of a preferred embodiment of the invention shown attached to a typical personal mobile transport vehicle in a fully deployed forward position.

In accordance with an embodiment of the invention, FIG. 1 shows a coupling apparatus 100 for the temporary attachment of mobile intravenous infusion units (I.V. stands) to mobile transport vehicles. Said coupling apparatus 100 is shown mounted to a typical personal mobile transport vehicle 200 (in this instance—a wheelchair) and comprises a rotatable arm member 10 for receiving and releaseably holding a vertical pole or standard 310 of a typical mobile I.V. stand 300 and which is operably attached to a securing means 20.

Figure 2:
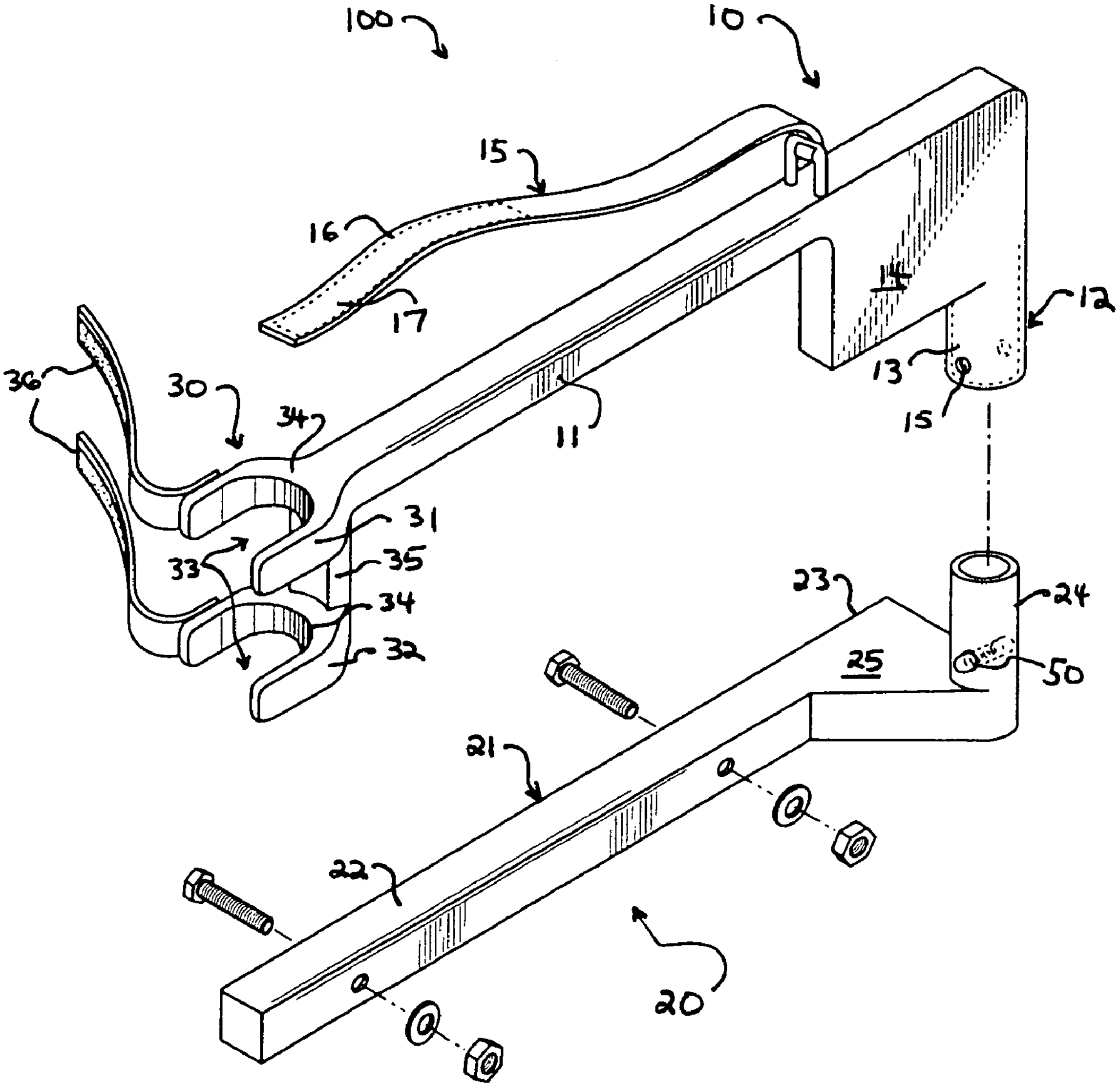
FIG. 2 is an exploded perspective view of the embodiment of FIG. 1 showing the invention in a stored or retracted configuration.
Figure 3:
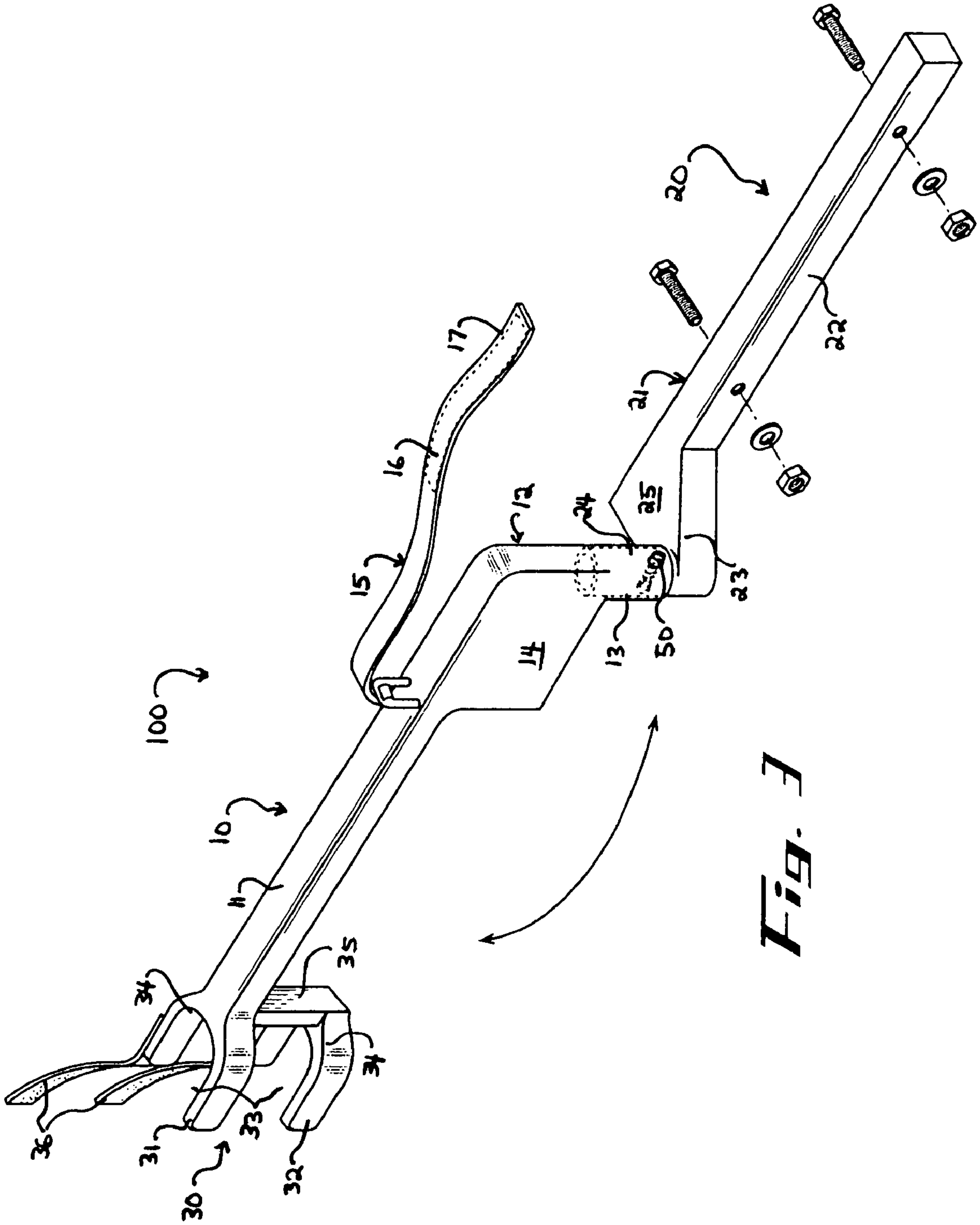
FIG. 3 is a perspective view of the embodiment of FIG. 1 shown in a detached, forward deployed, configuration.
Figure 4:
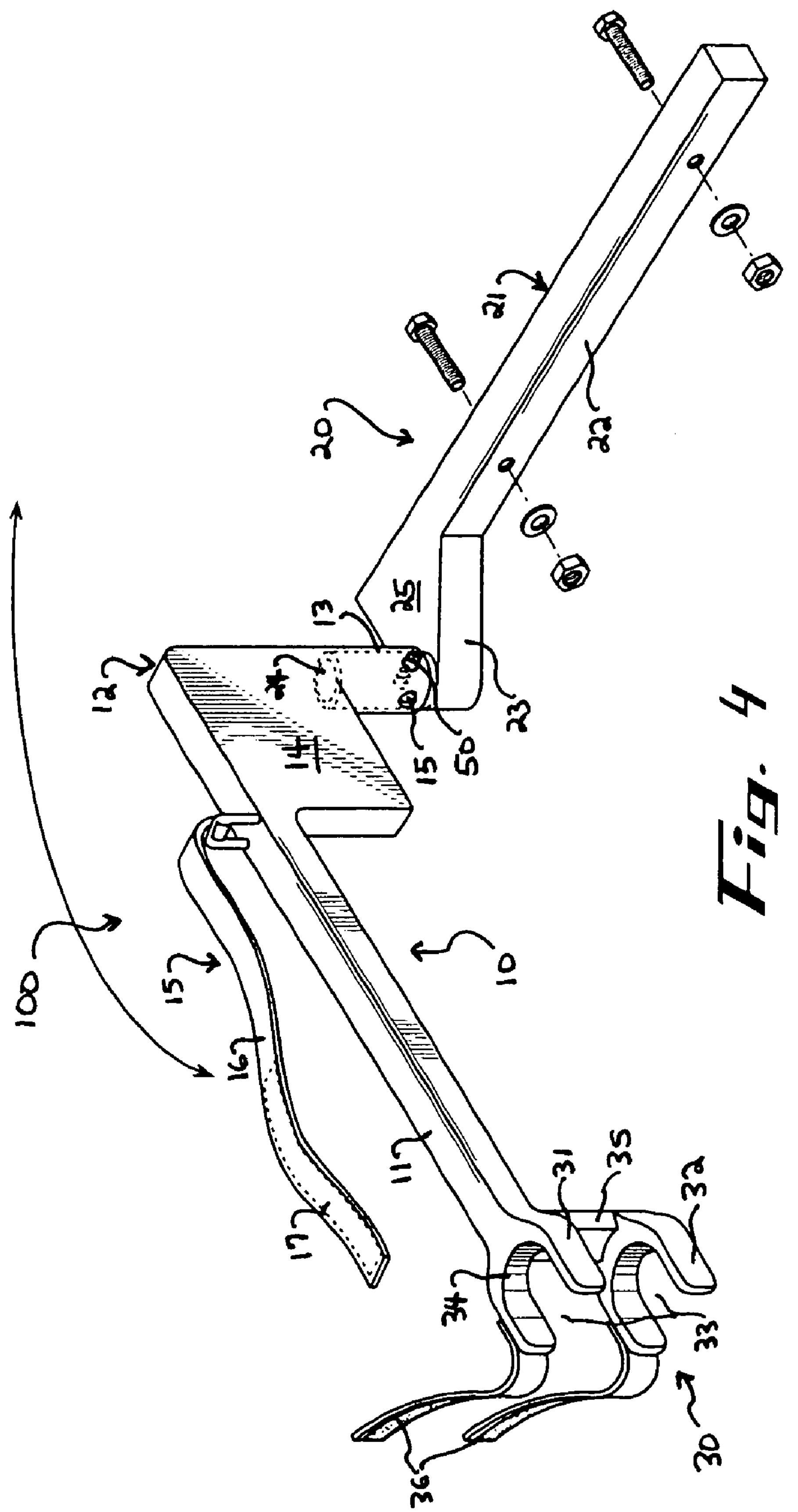
FIG. 4 is a prospective view of the embodiment of FIG. 1 showing the device in a 90° deployed configuration.

As best seen in FIGS. 2, 3 & 4, the rotatable arm member 10 of said coupling apparatus 100 further comprises a cradle means 30 defining the distal end of said arm member 10; a mounting means 12 for rotatably engaging the securing means 20 of said coupling apparatus 100; a stabilization means 15; and, an elongated arm portion 11 extending between said cradle means 30 and said mounting means 12. Said cradle means 30 of said arm member 10 comprises a pair of U-shaped cradle members 31 & 32 defining an upper cradle member 31 and a lower cradle member 32. Each said U-shaped cradle member 31 & 32, by definition, has an open end 33 and a closed end 34. Said upper U-shaped cradle member 31 forms a homogeneous extension of the elongated portion 11 of said arm member 10 with its open end 33 extending outwardly therefrom. The closed ends 34 of said upper and lower cradle members 31 & 32 are spaceably and rigidly attached one to the other via a bar member 35 extending perpendicularly between said cradle members 31 & 32 so that said cradle members 31 & 32 form parallel extensions of said elongated portion 11 of said arm member 10. As shown in FIG. 1, the open ends 33 of said cradle members 31 & 32 of said cradle means 30 are designed to nestably receive the vertical standard or pole 310 of said typical mobile I.V. stand 300. The cradle members 31 & 32 are provided with securing straps 36 for closing the open ends 33 of said cradle members 31 & 32 in order to secure said standard or pole 310 within said cradle means 30 during a transport operation. The securing straps 36 of said cradle members 31 & 32 may be constructed of various materials and may use hook and loop material as the securing mechanism to close the open ends 33 of said cradle members 31 & 32 around the vertical standard or pole 310 of said I.V. stand 300 during use. As best seen in FIG. 2, the mounting means 12 of said arm member 10 is defined by a cylindrical sleeve member 13 adjacent to, and extending laterally from, said arm member 10 for slidably and rotatably engaging said securing means 20. Said sleeve member 13 forms a homogeneous extension of the elongated arm portion 11 of said arm member 10 and has one or more adjustment holes 15 positioned around the circumference of said sleeve member 13 for use in locking the rotation of said arm member 10. For added strength and stability, additional structural material 14 may be added adjacent to the end of said elongated arm portion 11 of said arm member 10 between said arm portion 11 and the sleeve member 13 of said mounting means 12. As best seen in FIGS. 2, 3 & 4, the stabilization means 15 of said arm member 10 is attached at one end to the upper surface of the arm portion 11 of said arm member 10 and comprises an elongated strap 16 of flexible and durable material. Said stabilization strap 16 may be used to secure and stabilize medical equipment or lines attached to, or emanating from, said mobile I.V. stand 300 during patient relocation or transport. In a preferred embodiment, a portion of said stabilization strap 16 is provided with hook and loop material 17 for quickly and easily securing and stabilizing said equipment or lines during patient relocation or transport and for quickly and easily releasing said equipment or lines when the transport operation is complete.

The securing means 20 of said coupling apparatus 100 comprises a mounting arm 21 having a base portion 22, a mounting platform portion 23 and a cylindrical post member 24. The base portion 22 of said mounting arm 21 is designed for horizontal attachment to one side of a personal mobile transport vehicle such as a wheelchair, mobile stretcher or gurney and may be attached to said mobile transport vehicle by various securing means such as the use of nuts and bolts or clamps or by other more permanent means such as by welding or soldering. The mounting platform portion 23 of said mounting arm 21 forms a homogeneous extension of said mounting arm 21 at one end and defines a horizontal surface 25 for accommodating said cylindrical post member 24. The cylindrical post member 24 of said mounting arm 21 extends vertically from the horizontal surface 25 of said mounting platform portion 23 of said mounting arm 21 for slidably and rotatably receiving and engaging the cylindrical sleeve member 13 of said mounting means 20 of said arm member 10. As best seen in FIGS. 2, 3 & 4, the cylindrical post member 24 of said mounting arm 21 further comprises a spring-loaded lock pin 50 near the base of said post member 24. Said spring-loaded lock pin 50 is designed to protrude slightly from the external surface of said post member 24 for engaging the adjustment holes 15 of said sleeve member 13 of said arm member 10 in order to lock the position of said arm member 10 as needed or desired.

FIG. 1 shows the apparatus 100 being attached to one side of a typical wheelchair 200, however, it will be understood that the apparatus can be installed on either side of the desired mobile transport vehicle with equal effectiveness and may be installed for deployment in either a forward or rearward direction.

While the invention has been particularly shown and described with reference to the preferred embodiment thereof, it will be understood by those skilled in the art that various alterations in form, detail and construction may be made therein without departing from the spirit and scope of the invention.

The embodiments of the invention in which an exclusive property right or privilege is claimed are defined as follows:

1. A coupling apparatus for the temporary attachment of a mobile medical apparatus, said mobile medical apparatus having a vertical pole or standard attached to a wheeled or castered base, to a personal mobile transport vehicle, said coupling apparatus comprising:

a support means adapted to be secured to one side of said personal mobile transport vehicle; said support means comprising a mounting arm having a cylindrical post member vertically mounted at the distal end of said mounting arm;

an elongated arm member pivotally coupled to said support means, wherein said arm member comprises a cradle means at its distal end for receiving and releaseably holding the vertical pole or standard of said mobile medical apparatus, and wherein said arm member is pivotable within a horizontal plane from a collapsed or storage position alongside said mobile transport vehicle to one or more working or deployed positions about said mobile transport vehicle; said elongated arm member further comprising a cylindrical sleeve member at its proximal end, said sleeve member having one or more holes positioned around the circumference of said sleeve member for slidably and pivotally engaging the cylindrical post member of the mounting arm of said support means; said elongated arm member further comprising an elongated strap means attached at one end to said arm member for securing and stabilizing medical equipment or lines which may be attached to, or which may emanate from, said mobile medical apparatus; said elongated strap means being provided with hook and loop material for securing and stabilizing said medical equipment or lines; and, means for locking the position of said elongated arm member as said arm member is pivoted through said horizontal plane to said one or more working or deployed positions with respect to said mobile transport vehicle; said means for locking the position of said elongated arm member comprising a spring-loaded lock pin operably attached to said cylindrical post member of said support means for lockably engaging the holes of said sleeve member of said arm member as said arm member is pivoted about said cylindrical post member of said support means.

* * * * *